(No Model.)
R. M. DIXON.
VALVE.
No. 554,915. Patented Feb. 18, 1896.
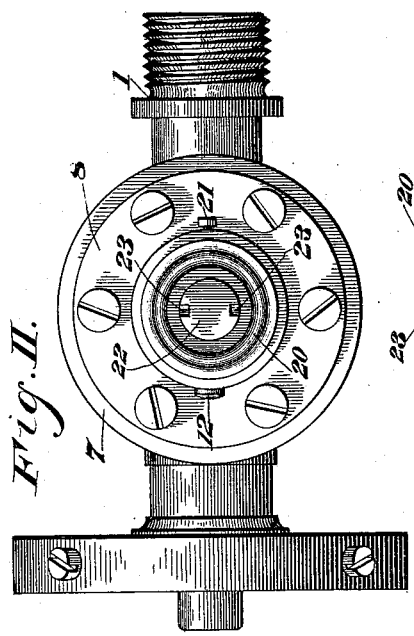
Fig. II.
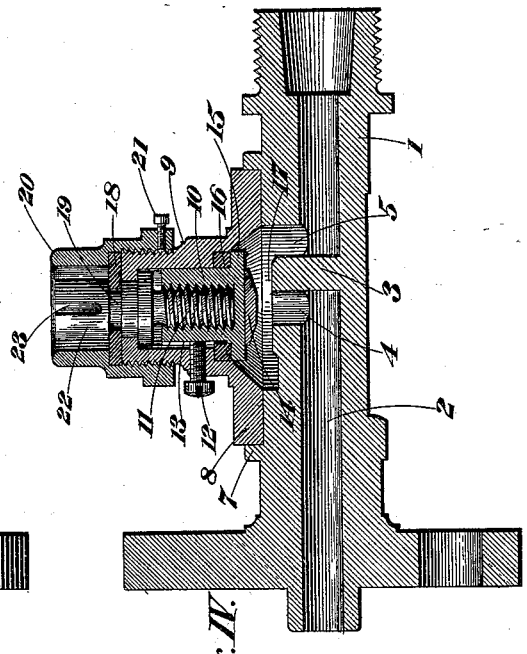
Fig. IV.
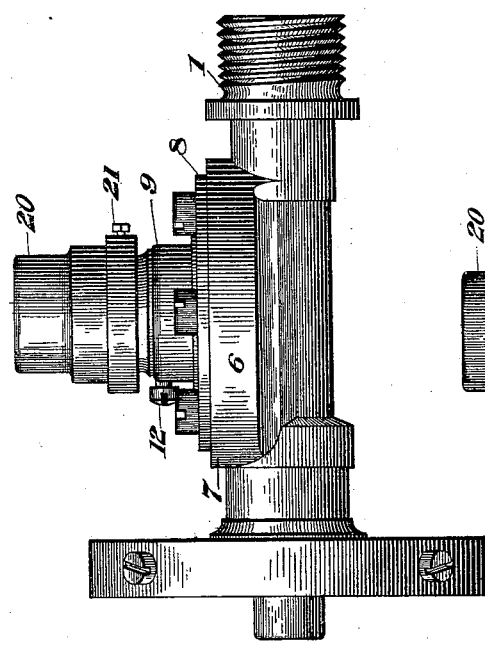
Fig. I.
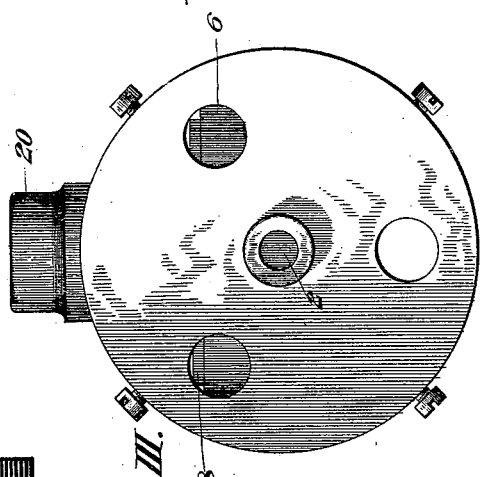
Fig. III.
Witnesses
J. M. Withrow
S. Macker
Robert M. Dixon,
Inventor
By Joseph L. Atkins
Attorney

UNITED STATES PATENT OFFICE.

ROBERT MUNN DIXON, OF EAST ORANGE, NEW JERSEY, ASSIGNOR TO THE SAFETY CAR HEATING AND LIGHTING COMPANY, OF NEW YORK, N. Y.

VALVE.

SPECIFICATION forming part of Letters Patent No. 554,915, dated February 18, 1896.

Application filed March 14, 1895. Serial No. 541,778. (No model.)

*To all whom it may concern:*

Be it known that I, ROBERT MUNN DIXON, of East Orange, county of Essex, State of New Jersey, have invented certain new and useful Improvements in Valves, of which the following is a specification, reference being had to the accompanying drawings.

The object of my invention is to produce an improvement in valves especially designed for regulating the flow of gas and for preventing its escape, without the use of a packing-joint.

Gas on account of its permeative qualities cannot be for a long time confined by a packing-joint, and for that reason the use of a valve, including a jacket-joint, is undesirable.

My valve is especially designed to be used in connection with a car for filling a gas-tank upon a car, but its use is not confined within those limits.

In the accompanying drawings, Figure I is a side elevation of my valve. Fig. II is a top plan view, Fig. III an end view, and Fig. IV a central longitudinal section, thereof.

Referring to the figures on the drawings, 1 indicates a pipe-joint having a longitudinal bore 2 interrupted by a septum 3, which defines upon opposite sides of its ports 4 and 5.

6 indicates a disk plate which is preferably cast with the joint above the ports 4 and 5 and concentric with the former.

7 indicates an annular rim which surrounds and defines the disk and forms a close-fitting seat for the disk-base 8 of the valve-case 9. The valve-case contains a neatly-fitting transversely-movable valve 10, that may be driven by a screw 11 screwing into the top of the valve. Rotary movement of the valve is prevented, as by a screw 12 screwing into the side of the valve-case and entering a longitudinal groove 13 in the side of the valve. The valve is double packed. For example, the bottom of the valve is provided with a packing-disk 14, which, when the valve is driven down, forms a close joint with the valve-seat at the top of port 4. Upon its lower end the valve-case is provided with an annular flange 15, above which is supported a movable annular packing-joint 16, which fits closely into a recess provided for it within the valve-case when the valve is elevated, and forms therewith a tight joint. A circular chamber 17, formed in the upper part of the pipe-joint 1 and in the under side of the base 8, provides for the free movement of the valve and communication between the ports 4 and 5. By this means it will be perceived that all leakage of gas can be prevented when the packing-disk 14 is closed over the port 4, or, on the other hand, when the port is open and the packing-ring 16 is forced into its seat in the valve-case. The screw 11 is held revolubly fixed, as by an annular ring 18, that fits into a groove 19 in the stem of the screw and that is held in place by a bonnet 20 screwing on the outside of the valve-case, and fixed as by a set-screw 21. The head 22 of the screw is provided with the usual notches 23 for operating it.

What I claim is—

1. The combination with pipe, septum and ports, of a valve-case above the ports provided with an annular valve-seat, a valve within the valve-case provided with a packing-disk and a packing-ring adapted, respectively to form a tight joint between the valve and one of the ports and to be seated within the valve-seat of the casing, means for preventing the rotation of the valve, a screw actuating the valve and provided with a stem projecting through the top of the valve-case, said stem being provided with an annular groove immediately above the valve-case and with a head above the groove, a detachable ring supported upon the valve-case and engaging the groove in the valve-stem, and a bonnet screwed upon the valve-case clamping the annular ring thereto and inclosing the head of the valve-screw stem, substantially as specified.

2. The combination with a pipe, septum and ports, of a valve-case above the ports provided with an annular valve-seat, a valve within the valve-case provided with a packing-disk and a packing-ring adapted, respectively, to form a tight joint between the valve and one of the ports and to be seated within the valve-seat of the casing, means for preventing the rotation of the valve, a screw actuating the valve and provided with a stem projecting through the top of the valve-case, said stem being provided with an annular groove immediately above the valve-case and with a head above the groove, a detachable ring supported upon the valve-case and engaging the groove in the valve-stem, a bonnet screwed upon the valve-case clamping the annular ring thereto and inclosing the head of the valve-screw stem, and means for securing the bonnet against rotation, substantially as specified.

3. The combination with a pipe and ports, of a disk concentric with one of the ports and defined by an annular rim, a valve-case provided with a disk-base fitting closely within the annular rim, means for securing the disk-base to the disk, and a valve within the valve-case, substantially as specified.

4. The combination with a valve, valve-casing and valve-actuating screw provided with an annular groove immediately above the valve-casing, of an annular ring seated within the annular groove and supported upon the top of the valve-casing, and a bonnet provided with internal screw-threads designed to engage external screw-threads upon the casing and with an internal annular shoulder of a less internal diameter than the external diameter of the annular ring and adapted to hold said ring in place, said bonnet extending to the top of the actuating-screw and surrounding the same, substantially as specified.

In testimony of all which I have hereunto subscribed my name.

ROBERT MUNN DIXON.

Witnesses:
  WILLIAM STEWART,
  JNO. J. MALLAY.